US006834542B2

(12) United States Patent
Aschner et al.

(10) Patent No.: US 6,834,542 B2
(45) Date of Patent: Dec. 28, 2004

(54) METHOD FOR DETERMINING THE ATMOSPHERIC PRESSURE ON THE BASIS OF THE PRESSURE IN THE INTAKE LINE OF AN INTERNAL COMBUSTION ENGINE

(75) Inventors: Werner Aschner, Ulm (DE); Ulrich Engel, Plochingen (DE); Hans Fausten, Schlierbach (DE); Juergen Muenzenmaier, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/367,959

(22) Filed: Feb. 19, 2003

(65) Prior Publication Data

US 2003/0221480 A1 Dec. 4, 2003

(30) Foreign Application Priority Data

Feb. 19, 2002 (DE) ........................................ 102 06 767

(51) Int. Cl.[7] .............................................. G01M 15/00

(52) U.S. Cl. ........................................ 73/118.2; 73/115

(58) Field of Search ........................... 73/112, 115, 116, 73/117.2, 117.3, 118.1, 118.2, 119 R; 340/438, 439; 701/29

(56) References Cited

U.S. PATENT DOCUMENTS 5,604,306 A * 2/1997 Schricker ................... 73/118.2
5,631,412 A * 5/1997 Tomisawa .................. 73/118.2
5,728,932 A * 3/1998 Uchikawa .................. 73/118.2
6,324,903 B1 * 12/2001 Ohsaki et al. ............. 73/118.2
2003/0154777 A1 * 8/2003 Worth et al. ............... 73/118.2

FOREIGN PATENT DOCUMENTS

| | | | |
|---|---|---|---|
| DE | 3642992 | A1 | 6/1988 |
| DE | 3914653 | A1 | 11/1989 |
| DE | 3835672 | A1 | 4/1990 |
| DE | 197 10 981 | A1 | 10/1998 |
| DE | 19937154 | A1 | 2/2001 |
| EP | 0698408 | A1 | 2/1996 |
| EP | 1143232 | A1 | 10/2001 |

OTHER PUBLICATIONS

German Search Report mailed Nov. 3, 2003, (10206767.8).

* cited by examiner

*Primary Examiner*—Eric S. McCall
(74) *Attorney, Agent, or Firm*—Crowell & Moring LLP

(57) ABSTRACT

A method for determining the atmospheric pressure on the basis of the intake pressure measured downstream of an air filter in an intake line of an internal combustion engine, and of the air mass flow rate measured downstream of the air filter, and optionally of the intake air temperature. The calculation of the atmospheric pressure and the calculation of a degree of contamination of the air filter are separated by standardizing the measured air mass flow rates at two predefined values. Furthermore, during the calculation a characteristic curve for the degree of contamination of the air filter as a function of the determined pressure difference at the predefined air mass flow rates is used, and a characteristic diagram for the degree of contamination of the air filter as a function of the standardized air mass flow rate and of the determined pressure difference is used.

9 Claims, 4 Drawing Sheets

1/4

METHOD FOR DETERMINING THE ATMOSPHERIC PRESSURE ON THE BASIS OF THE PRESSURE IN THE INTAKE LINE OF AN INTERNAL COMBUSTION ENGINE

BACKGROUND AND SUMMARY OF THE INVENTION

This application claims the priority of German Patent Document 102 06 767.8, filed on Feb. 19, 2002, the disclosure of which is expressly incorporated by reference herein.

The invention relates to a method for determining the atmospheric pressure on the basis of the intake pressure measured downstream of an air filter in an intake line of an internal combustion engine and the air mass flow rate measured downstream of the air filter and of the intake air temperature.

The increasing demands made in terms of power, exhaust emissions and comfort in modern internal combustion engines can be met only by using an engine electronic controller. It senses the operating parameters of the internal combustion engine, for example the rotational speed, temperatures, pressures, and determines from them optimum setting values for the engine-actuating variables, for example start of injection, duration of injection, charging pressure and the exhaust gas feedback rate. In order to measure the operating parameters, sensors are used, for example atmospheric pressure sensors, intake pressure sensors, intake air temperature sensors or air mass flow rate meters. Sometimes it is also possible to derive operating parameters from other measured variables and thus save the costs for sensors.

German Patent Document DE 197 10 981 A1 discloses a method of the generic type for determining the degree of contamination of an air filter. It discloses two alternatives. On the one hand it is proposed to measure the pressure prevailing downstream of the air filter in the intake tract of an internal combustion engine by means of a sensor. In addition, the ambient pressure is to be sensed by means of a sensor, for example for the air conditioning system, which is arranged outside the intake tract, and the degree of contamination of the air filter is subsequently measured from the pressure difference. It is disadvantageous here that two pressure sensors are necessary. As a further alternative it is disclosed that the atmospheric pressure upstream of the air filter is to be calculated from the air mass flow rate, air temperature and intake manifold pressure measured variables when the internal combustion engine is in a predefined operating state. The atmospheric pressure which is calculated in this way is then to be used in turn to determine the degree of contamination of the air filter by means of formation of pressure differences. The way in which the atmospheric pressure is to be calculated is not disclosed.

However, the problem is that, for the calculation of the atmospheric pressure, the contamination of the air filter is an important input variable which should not be neglected under any circumstances. However, according to the prior art said input variable is only calculated in a second step, from the previously calculated atmospheric pressure.

An aspect of the invention is therefore to provide a method with which both the atmospheric pressure and the degree of contamination of an air filter can be calculated, on the basis of the measured pressure in the intake manifold of an internal combustion engine, reliably and with sufficient precision.

This aspect may be achieved by determining a standardized air mass flow rate from measured values for the air mass flow rate and for the intake pressure; measuring the intake pressure with a first air mass flow rate and a second standardized air mass flow rate and calculating a pressure difference therefrom; determining a degree of contamination of the air filter from the calculated pressure difference by reference to a characteristic curve stored as a function of the pressure difference; reading out a pressure loss from a pressure difference characteristic diagram which is stored as a function of the standardized air mass flow rate and the degree of contamination of the air filter, and determining the atmospheric pressure from a sum of the intake pressure measured in the intake line and the pressure loss occurring at the air filter.

The method according to certain preferred embodiments of the invention makes it possible to determine the atmospheric pressure on the basis of the intake pressure, the intake air temperature and the air mass flow rate so that a separate atmospheric pressure sensor can be dispensed with. This is advantageous with respect to the costs and the required installation space in the intake tract of the internal combustion engine.

The problem that the degree of contamination of the air filter is not to be neglected when determining the atmospheric pressure is avoided by separating the calculation of the degree of contamination of the air filter from the calculation of the atmospheric pressure. The contamination of the air filter is calculated first without requiring the current atmospheric pressure to do so. The degree of contamination of the air is then used in the second step to calculate the atmospheric pressure.

This is made possible by standardizing the air mass flow rate to a predefined reference temperature and a predefined reference pressure. This standardization ensures that a change in pressure difference at the air filter which is caused by an increase in altitude or a change in air temperature is converted to the standardized conditions during development. By virtue of this standardization, the pressure difference then depends only on the standardized air mass flow rate and on the degree of contamination of the air filter.

By including the intake air temperature in the calculation of the standardized air mass flow rate, the precision of the method can be improved.

Depending on the operation of the engine, it is also possible that one of the two standardized air mass flow rates at which the measurements are performed does not occur over a relatively long time period. As a result, the vehicle may travel through a relatively large difference in altitude between the sensing of the respective atmospheric pressures. In this case, the method would determine an incorrect degree of contamination of the air filter. In order to prevent this, the atmospheric pressures can either be monitored directly or else it is also possible to monitor that a predefined time period or a predefined distance is not exceeded between the measurements at the two standardized air mass flow rates.

In the non-steady-state operating mode of the internal combustion engine it is possible for a phase shift to occur between the standardized air mass flow rate and the intake pressure, which leads to an error in the calculation of the atmospheric pressure. In order to prevent this, the change in the standardized air mass flow rate over time can be continuously monitored and the determination of the atmospheric pressure can be suspended during the non-steady-state operation.

As both the atmospheric pressure and the degree of contamination of the air filter are very slowly changing variables, it is possible for a first-order time delay filter for filtering out relatively small interference to be respectively provided at the output of the evaluation unit for the atmospheric pressure or for the degree of contamination of the air filter.

Other objects, advantages and novel features of the present invention will become apparent from the following detailed description of the invention when considered in conjunction with the accompanying drawings.

DETAILED DESCRIPTION OF THE DRAWINGS

Figure 1:
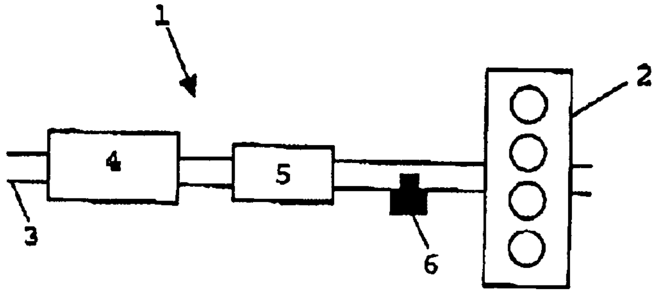
FIG. 1 shows a structural diagram of an air intake system of an internal combustion engine.

The structural diagram represented in FIG. 1 shows the intake tract 1 of an internal combustion engine 2. An air filter 4, an air mass flow rate meter 5 and an intake pressure sensor 6 are arranged one behind the other in the direction of flow in an intake line 3. The temperature T1 of the intake air is also preferably determined at the same time using the air mass flow rate meter 5 with an integrated temperature sensor. Of course, a further separate sensor may also be provided as an alternative to this. Upstream of the air filter 4, the pressure of the intake air P1 is equal to the atmospheric pressure Patm. The intake air flows through the air filter and the air mass flow rate meter 5. The air mass flow rate meter 5 measures the air mass flow rate LM' of the intake air and the temperature T1 of the intake air downstream of the air filter 4 by way of the integrated temperature sensor. The intake pressure sensor 6 senses the pressure P1 of the intake air downstream of the air filter 4.

The following pressure difference dP builds up between the input and the output of the air filter 4 owing to the flow resistance:

$$dP=P_{atm}-P1 \tag{1}$$

According to the laws of fluid flow physics and the general gas equation, the pressure difference dP depends on the following four parameters:

air mass flow rate LM' degree V of contamination of the air filter intake pressure downstream of air filter P1 intake air temperature T1

$$dP=f(LM',V,P1,T1) \tag{2}$$

Figure 2:
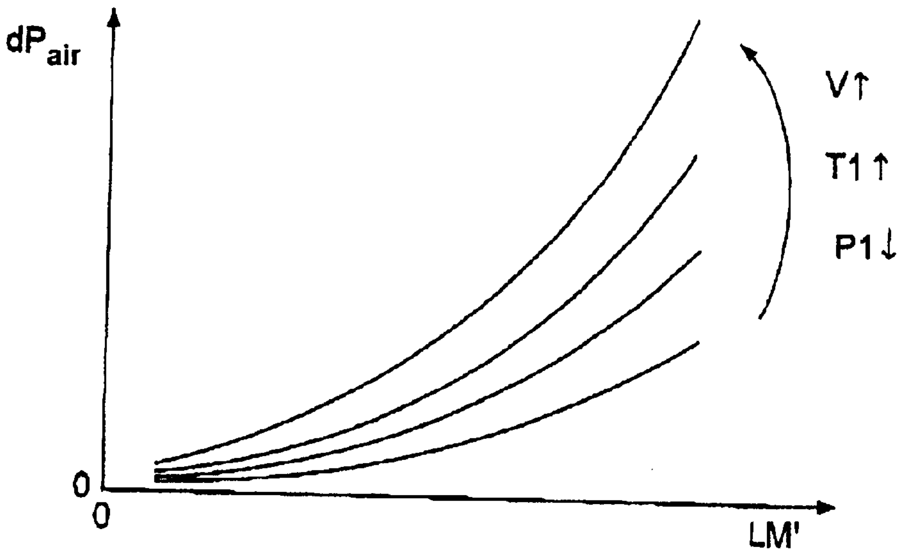
FIG. 2 shows a basic representation of a pressure-difference characteristic diagram as a group of characteristic curves as a function of the air mass flow rate.

The graphic representation of a pressure-difference characteristic diagram as a group of characteristic curves in FIG. 2 shows, in a qualitative fashion, how the pressure difference dP at the air filter 4 depends on the other parameters. The arrows indicate that the pressure difference dP rises when a parameter changes in the direction of the arrow after it.

The description of the physical relationships at the air filter 4 according to equation (2) is complex as four input parameters have to be taken into account. It can be simplified if a suitable standardization rule is introduced and the air mass flow rate LM' is replaced by the standardized air mass flow rate LM'stand.

Such a standardization rule LM'stand=f(LM') is derived in what follows. If it is applied, the pressure difference dP then only depends on two parameters, specifically:

the standardized air mass flow rate LM'stand and the degree V of contamination of the air filter According to the laws of fluid flow physics, the following applies to the pressure drop and the flow rate in a tube through which there is a flow:

pressure drop:

$$\Delta p = \alpha * \frac{\rho}{2} * c^2 \tag{3}$$

where $\alpha$=coefficient of flow $\rho$=gas density c=flow rate flow rate:

$$c = \frac{\dot{m}}{A * \rho} \tag{4}$$

where $\dot{m}$=air mass flow rate

A=flow cross section $\rho$=gas density

The general gas density is:

$$\rho = \frac{p}{R * T} \tag{5}$$

where $\rho$=gas density p=pressure

T=temperature

R=specific gas constant

Inserting equation (4) into equation (3) yields:

$$\Delta p = \alpha * \frac{\rho}{2} * \left(\frac{\dot{m}}{A * \rho}\right)^2 = \frac{\alpha}{2 * A^2} * \frac{\dot{m}^2}{\rho} \tag{6}$$

Inserting equation (5) into equation (6) yields:

$$\Delta p = \frac{\alpha * R}{2 * A^2} * \frac{\dot{m}^2 * T}{p} = const * \frac{\dot{m}^2 * T}{p} \tag{7}$$

If this result is applied to the air filter 4 through which there is a flow and if the relationships from equations (1) and (2) are inserted into equation (7), the following is obtained for the pressure difference dP:

$$dP = const * \frac{LM'^2 * T1}{P1} \tag{8}$$

In order to standardize the air mass flow rate LM', a constant reference temperature T1ref is obtained for the intake air temperature T1, and a constant reference pressure P1ref is obtained for the intake pressure downstream of air filter P1. Under these standardization conditions, the pressure difference is referred to as dPstand and the air mass flow rate as LM'stand. If these values are inserted into equation (8), the following is obtained:

$$(dP)_{stand} = const * \frac{LM'^2_{stand} * T1_{ref}}{P1_{ref}} \tag{9}$$

where $T1_{ref}$=reference temperature of the intake air $P1_{ref}$=reference pressure for the intake pressure $LM'_{stand}$=air mass flow rate under normal conditions $dP_{stand}$=pressure difference under normal conditions The standardization ensures that the pressure difference is the same under measured conditions and under standard conditions. This means that equation (8) and equation (9) should be equated.

$$const * \frac{LM'^2_{stand} * T1_{ref}}{P1_{ref}} = const * \frac{LM'^2 * T1}{P1}$$

Resolved according to LM'stand, the standardization rule for the air mass flow rate is obtained:

$$LM'_{stand} = LM' * \sqrt{\frac{P1_{ref}}{P1} * \frac{T1}{T1_{ref}}} \tag{10}$$

By virtue of this standardization, the pressure difference dP then depends only on the two parameters of the standardized air mass flow rate LM'stand and degree (V) of contamination of the air filter.

$$dP = f(LM'_{stand}, V) \tag{11}$$

Figure 3:
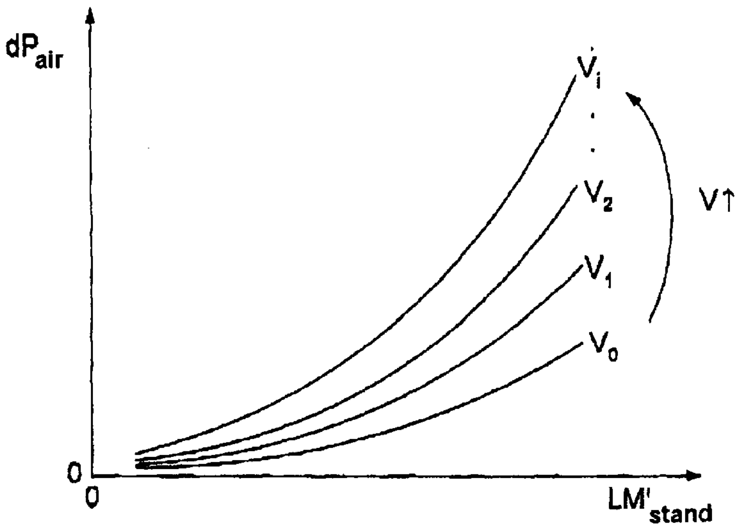
FIG. 3 shows a basic representation of a pressure-difference characteristic diagram as a group of characteristic curves as a function of the standardized air mass flow rate.

This clarifies the representation of a pressure-difference characteristic diagram by way of a group of characteristic curves in FIG. 3. The pressure difference dP at the air filter 4 increases as the degree V of contamination of the air filter rises. Each characteristic curve is unambiguously assigned a degree Vi of contamination of the air filter.

If an air flow rate meter in the design without an integrated air temperature sensor is used, the air intake temperature T1 is not available as a measured value. If the approximation $T1 = T1_{ref}$ is inserted into equation (10), the following is obtained for the standardized air mass flow rate (LM'stand):

$$LM'_{stand} = LM' * \sqrt{\frac{P1_{ref}}{P1}} \tag{10a}$$

As a result, a standardization error of the magnitude $\sqrt{T1/T1_{ref}}$ is caused. Assuming that the air intake temperature (T1) deviates at maximum +/−30 Kelvin from the reference temperature (T1ref), the maximum error during the calculation of LMstand is +/−5%. The calculation precision for the atmospheric pressure (Patm) and the degree V of contamination of the air filter is thus only reduced to an insignificant degree.

Figure 4:
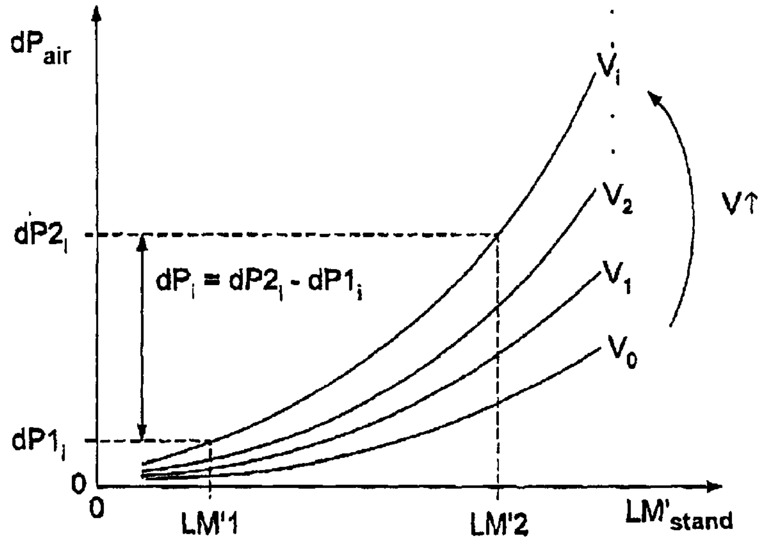
FIG. 4 shows a basic representation of a pressure-difference characteristic diagram with characteristic curves of constant contamination of the air filter for determining the gradient.

The characteristic diagram dP=f(LM'stand, V) of the pressure difference can be determined on an engine test bench. For this purpose, the degree V of contamination of the air filter and the standardized air mass flow rate LM'stand are varied and the associated pressure differences dP are measured. If the measured values are represented graphically by characteristic curves for constant degrees of contamination of the air filter as shown in FIG. 4, it becomes apparent that:

the gradient of each characteristic curve rises as LM'stand increases the average gradient of each characteristic curve rises as the degree V of contamination of the air filter increases On the basis of these qualitative statements, a quantifiable, computer-oriented method has been derived which makes it possible to determine the degree V of contamination of the air filter from the standardized air mass flow rate LM'stand and the intake pressure downstream of the air filter P1 if the characteristic diagram of the pressure difference of the air filter is provided.

Firstly, an average gradient is determined for each characteristic curve of the characteristic diagram of the pressure difference. To do this, two fixed support points LM'1 and LM'2 are selected on the LM'stand axis and the associated pressure differences $dP1_i$ and $dP2_i$ are determined for each degree $V_i$ of contamination from the characteristic diagram for the pressure difference.

The pressure difference $$dP_1 = dP2_1 - dP1_1 \tag{12}$$

is a measure of the gradient of the characteristic curve of the pressure difference which is associated with the degree $V_i$ of contamination. For the rest of the derivation it is sufficient to calculate using the pressure difference $dP_i$. It is not necessary to use the gradient $dP_i$/(LM'2−LM'1) of the characteristic curve as the interval [LM'1, LM'2] is constant.

If the associated pressure difference $dP_i$ is determined for each degree $V_i$ of contamination according to the method above, i value pairs [$V_i$, $dP_i$] are obtained. These value pairs are represented graphically on the characteristic curve according to FIG. 5 in the form V plotted against dP. As the characteristic curve assigns a specific degree of contamination to each pressure difference, it is referred to as the contamination characteristic curve.

Equation (1) inserted into equation (12) yields:

$$dP_i = dP2_i - dP1_i = (P_{atm}\_2_i - P1\_2_i) - (P_{atm}\_1_i - P1\_1_i) = (P_{atm}\_2_i - P_{atm}\_1_i) + (P1\_1_i - P1\_2_i) \quad (13)$$

If it is assumed that the first term in equation (13) is equal to zero as the atmospheric pressure does not change during the registration of the measured values at the support points LM'1 and LM'2, the following is obtained:

$$dP_1 = P1\_1_1 - P1\_2_1 \quad (14)$$

The degree V of contamination of the air filter can thus be determined in the following four steps:

- the intake pressure downstream of air filter P1_1 is measured at the standardized air mass flow rate LM'1
- the intake pressure downstream of air filter P1_2 is measured at the standardized air mass flow rate LM'2
- the pressure difference $dP_i$ is calculated according to equation (14)
- the degree V of contamination of the air filter which is associated with the pressure difference $dP_i$ is read off from the contamination characteristic curve.

This method is suitable for implementation in an engine electronic system. In practical application in a vehicle, it is to be noted that the requirement for the transition from equation (13) to equation (14) is fulfilled. Depending on the operation of the engine, the standardized air mass flow rate LM'1 or LM'2 may not occur over a relatively long time period and the vehicle may travel through a relatively large difference in altitude between the registration of P1_1 and P1_2. In this case, the above method would determine an incorrect degree V of contamination of the air filter.

For this reason, the electronic engine system should preferably monitor the change in altitude between the registration of P1_1 and P1_2. If the change in altitude exceeds a fixed limiting value, the electronic engine system must not update the value for the contamination of the air filter.

In order to detect a non-permitted change in altitude, it is possible, for example, to use the calculated atmospheric pressure Patm as a monitoring variable. The electronic engine system updates the value for the contamination V of the air filter only if the absolute value of the first term in equation (13) is smaller than a limiting value Patmlimit.

$$|P_{atm}\_2_i - P_{atm}\_1_i| < P_{atmlimit} \quad (15)$$

The limit Patmlimit is to be set to a value which is very much smaller than actually occurring pressure differences dPi in equation (14). The error during the determination of the degree V of contamination of the air filter is then small and can be ignored.

However, instead of the atmospheric pressure Patm, it is also possible to use the time or the distance as a monitoring variable. In this case, the electronic engine system would then have to monitor that the registration of P1_1 and P1_2 lies within a fixed time interval or that the distance which is covered in the meantime is not too large.

If equation (1) is solved in accordance with the atmospheric pressure Patm and if equation (11) is taken into account, the following is obtained:

$$P_{atm} = P1 + dP(LM'_{stand}, V) \quad (16)$$

All the parameters on the right-side of the equation are provided as:

the intake pressure downstream of air filter (P1) is a measured variable, the characteristic diagram dP of the pressure difference can be determined on an engine test bench, the standardized air mass flow rate (LM'stand) is calculated from the air mass flow rate (LM'), intake pressure downstream of air filter (P1) and intake air temperature (T1) measured variables, and the degree (V) of contamination of the air filter is determined as described above.

In this way, the atmospheric pressure Patm can be determined using equation (16).

In order to try out calculating the atmospheric pressure Patm and the degree V of contamination of the air filter, a simulation model has been developed for the method described above. This simulation model was tested with data which had been recorded in an actual driving operating mode. The measurement extended over a distance of approximately 50 km and a difference in altitude of approximately 1000 m. In order to vary the degree of contamination of the air filter, prepared air filters were used which were changed during the recording of the data. During all the measurements, the atmospheric pressure was also recorded with an additional sensor. The atmospheric pressure measured forms the reference during the estimation of the errors for the calculated atmospheric pressure.

Figure 5:
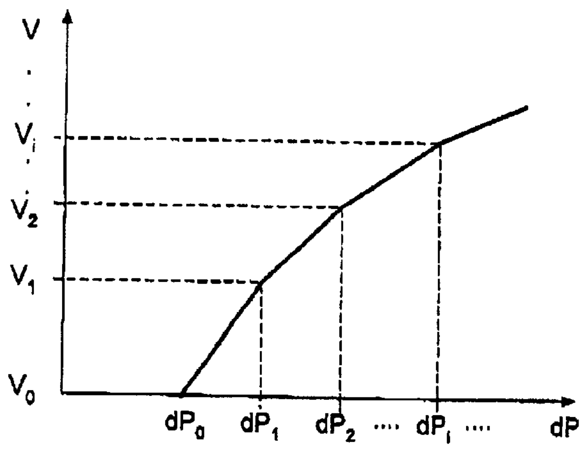
FIG. 5 shows a basic representation of what is referred to as a contamination characteristic curve, the degree of contamination of the air filter being plotted against the pressure difference.
Figure 6:
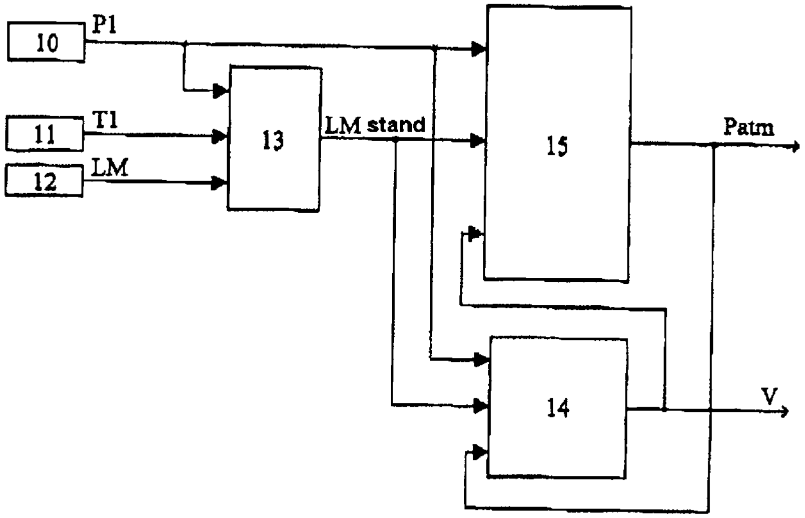
FIG. 6 shows an overview of the configuration of the method according to the invention.
Figure 7:
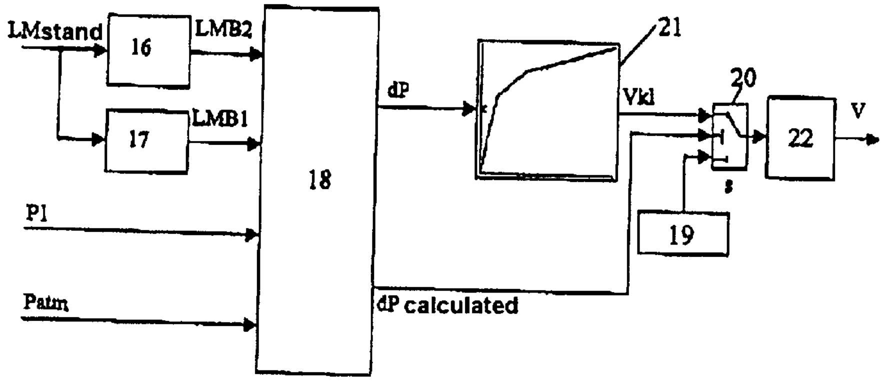
FIG. 7 shows a detailed representation of block 14 from FIG. 6.

The method according to the invention is described in more detail below with reference to FIGS. 5 to 7. The operating parameters comprising the intake pressure downstream of air filter P1, intake air temperature T1 and air mass flow rate LM' which were measured using sensors 10 to 12 are used as input variables. The atmospheric pressure Patm and the degree V of contamination of the air filter are calculated as output variables from the above.

The standardized air mass flow rate LM'stand is calculated in block 13 from the input variables comprising the intake pressure downstream of air filter P1, intake air temperature T1 and air mass flow rate LM' according to equation (10). In block 14, the degree V of contamination of the air filter is calculated from the intake pressure downstream of air filter P1, the standardized air mass flow rate LM'stand and the calculated atmospheric pressure Patm. Finally, the atmospheric pressure Patm is determined in block 15 from the intake pressure downstream of air filter P1, the standardized air mass flow rate LM'stand and the degree V of contamination of the air filter.

The content of block 13 will now be described in more detail with reference to FIG. 6. In the two first method steps, the respective intake pressures P1_1 and P1_2 are to be registered for the permanently predefined standardized air mass flow rates LM'1 and LM'2. For the application in the engine operating mode, this means that the times for which the following applies:

a) LM'stand=LM'1 b) LM'stand=LM'2 are to be registered in the signal profile of the standardized air mass flow rate LM'stand.

In case a), this task is performed by block 16, and in case b) by block 17. Owing to the restricted resolution of LM'stand, the fixed values LM'1 and LM'2 are preferably replaced by two narrow air mass flow rate bands which are positioned symmetrically about LM'1 and LM'2. The output LMB1 of the block 16 is a Boolean variable which has the value 1 if the standardized air mass flow rate LM'stand lies within the narrow air mass flow rate band about LM'1, and otherwise LMB1 has the value 0. Analogously, block 17 forms the signal LMB2 for the air mass flow rate band about LM'2.

In block 18, the pressure difference (dP) according to equation (14) is then calculated in the following steps:

1. The signal LMB1 is monitored and the P1 values are registered only if LMB1 has the value 1;
2. The first summand P1_1 of equation (14) is determined by preferably averaging a predetermined minimum number of P1 values. The formation of average values prevents errors during the determination of the contamination of the air filter in the non-steady-state operating mode of the engine;
3. After P1_1 has been calculated, the atmospheric pressure Patm is secured in the main memory;
4. Steps 1–3 are carried out in an analogous way by monitoring the signal LMB2 for the second summand P1_2 of equation (14);
5. Whenever a summand P1_1 or P1_2 is calculated, the model block checks whether the change in atmospheric pressure between the calculation of P1_1 and P1_2 is too large (equation 15); and
6. If this is not the case, the pressure difference dP is calculated according to equation (14).

As soon as the pressure difference dP is calculated, the contamination characteristic curve stored in a memory supplies the air filter contamination Vk1 in block 21.

At the start of a driving cycle, the variable dP_calculated has the value 0. This value indicates that the pressure difference dP has not yet been calculated. In this case, the constant V_memory is connected through via a switch 20. The constant V_memory has the value of the degree of contamination of the air filter which was valid at the end of the last driving cycle. This value is secured in an EEPROM memory 19 whenever the engine is shut off. As soon as the pressure difference dP is calculated for the first time, the value of dP_calculated changes from 0 to 1, and the switch 20 switches the newly calculated air filter contamination Vk1 to the output.

In addition, a block 22 may be provided which smoothes the signal for the air filter contamination Vk1. As the contamination of the air filter is a very slow process, the time constant of this block 22 which is preferably embodied as a first-order time delay filter is selected in the minute range.

Figure 8:
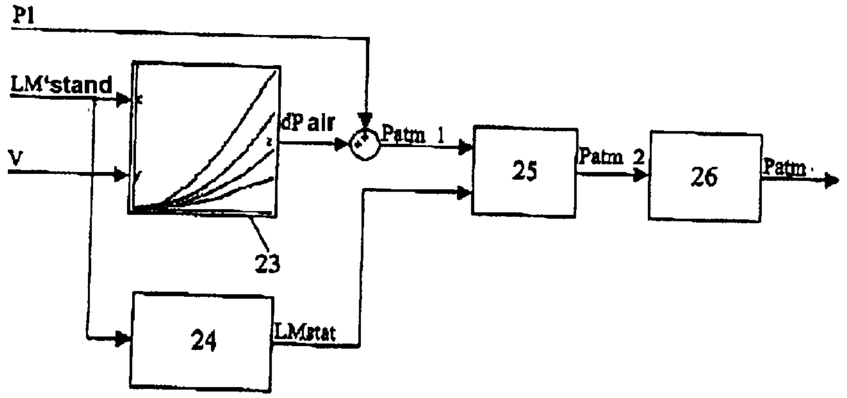
FIG. 8 shows a detailed representation of block 15 from FIG. 6.

The content of block 15 will now be explained in more detail with reference to FIG. 8. In this block 15, the atmospheric pressure Patm is calculated according to equation (16). Accordingly, a block 23 calculates the pressure difference dP on the basis of a characteristic diagram stored in a memory, as a function of the standardized air mass flow rate LM'stand and the degree V of contamination of the air filter. The sum of the intake pressure downstream of air filter P1 and the pressure difference dP yields the atmospheric pressure Patm_1.

In the non-steady-state operating mode of the engine, it is possible for a phase shift, which causes an error during the calculation of Patm_1, to occur between the standardized air mass flow rate LM'stand and the intake pressure. In order to avoid this, a block 24 monitors the dynamics of the standardized air mass flow rate LM'stand and indicates non-steady-state processes by way of the signal LMstat. If the gradient of LM'stand drops low a fixed limiting value, LMstat has the value 1, and otherwise the value 0.

As long as LMstat has the value 1, the block 25 switches the input Patm_1 to the output Patm_2. If LMstat switches over to the value 0 and thus indicates a non-steady-state operating mode, block 25 stores the last valid value of Patm_2 until LMstat signals steady-state operation again.

As a result of the switching-over of the holding function it is possible for small errors to occur in the atmospheric pressure Patm_2, which errors are filtered out by way of an additional block 26 which is preferably embodied as a first-order time delay filter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for determining atmosphere pressure comprising:

measuring an intake pressure downstream of an air filter in an intake line of an internal combustion engine, measuring an air mass flow rate downstream of the air filter, determining standardized air mass flow rates from measured values for the air mass flow rate and for the intake pressure, calculating a pressure difference from intake pressures measured at a first standardized air mass flow rate and a second standardized air mass flow rate, determining a degree of contamination of the air filter from the calculated pressure difference by reference to a stored characteristic curve, reading out a pressure loss from a pressure difference characteristic diagram which is stored as a function of the standardized air mass flow rates and the degree of contamination of the air filter, and determining the atmospheric pressure from a sum of the intake pressure measured in the intake line and the pressure loss occurring at the air filter.

2. Method according to claim 1, wherein a sensor for sensing an intake air temperature is additionally provided, a measured intake air temperature being taken into account in the determination of the standardized air mass flow rates.

3. Method according to claim 1, wherein a change in the atmospheric pressure is monitored between the measurements at the first and second standardized air mass flow rates.

4. Method according to claim 3, wherein a change in the degree of contamination of the air filter is detected only if an absolute difference between calculated atmospheric pressures does not exceed a predefined limiting value with the first and second standardized air mass flow rates.

5. Method according to claim 3, wherein a change in the degree of contamination of the air filter is detected only if a predefined time period or a predefined distance between measurement of the first and second standardized air mass flow rates is not exceeded.

6. Method according to claim 1, wherein when the internal combustion engine is shut off a last valid value of the degree of contamination of the air filter is stored in a non-volatile memory.

7. Method according to claim 1, wherein a change in a standardized air mass flow rate over time is continuously determined, and, wherein determination of the atmospheric pressure is suspended if the change exceeds a predefined limiting value.

8. Method according to claim 1, wherein values which are determined for the atmospheric pressure or the degree of contamination of the air filter are smoothed by way of a first-order time delay filter.

9. An assembly for determining atmospheric pressure comprising a system operatively utilizing the method of claim 1.

* * * * *